US011508132B2

(12) United States Patent
Dorin et al.

(10) Patent No.: US 11,508,132 B2
(45) Date of Patent: *Nov. 22, 2022

(54) COMPUTER IMPLEMENTED METHOD, A DEVICE AND A COMPUTER PROGRAM PRODUCT FOR AUGMENTING A FIRST IMAGE WITH IMAGE DATA FROM A SECOND IMAGE

(71) Applicant: Inter IKEA Systems B.V., LN Delft (NL)

(72) Inventors: Camila Dorin, Lund (SE); Jonas Gustavsson, Höör (SE)

(73) Assignee: Inter IKEA Systems B.V., LN Delft (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/179,842

(22) Filed: Feb. 19, 2021

(65) Prior Publication Data

US 2021/0272368 A1 Sep. 2, 2021

(30) Foreign Application Priority Data

Feb. 28, 2020 (EP) .................................... 20160241

(51) Int. Cl.
*G06T 19/00* (2011.01)
*G06T 7/11* (2017.01)
*G06V 10/44* (2022.01)
*G06N 20/00* (2019.01)

(52) U.S. Cl.
CPC ............. *G06T 19/006* (2013.01); *G06T 7/11* (2017.01); *G06V 10/443* (2022.01); *G06N 20/00* (2019.01)

(58) Field of Classification Search
None
See application file for complete search history.

(56) References Cited

U.S. PATENT DOCUMENTS

| 9,514,473 | B2 | 12/2016 | Dassault | |
| 9,514,573 | B2 | 12/2016 | Grimaud | |
| 10,319,150 | B1* | 6/2019 | Canada | ............. G06Q 30/0643 |
| 2010/0092930 | A1* | 4/2010 | Fletcher | ................ G09B 19/22 |
| | | | | 434/178 |
| 2018/0260842 | A1 | 9/2018 | Hiranandani et al. | |
| 2019/0034076 | A1* | 1/2019 | Vinayak | ................ G06F 3/0346 |
| 2019/0156582 | A1 | 5/2019 | Yankovich et al. | |

(Continued)

FOREIGN PATENT DOCUMENTS

WO WO-2021178537 A1 * 9/2021 ............... G06K 9/46

OTHER PUBLICATIONS

Fuchang Liu, Shuangjian Wang, Dandan Ding, Qingshu Yuan, Zhengwei Yao, Zhigeng Pan, Haisheng Li, Retrieving Indoor Objects : 2D-3D Alignment Using Single Image and Interactive ROI-based Refinement, 2018, Computers and Graphics, 70:108-117 (Year: 2018).*

(Continued)

*Primary Examiner* — Michael J Cobb
(74) *Attorney, Agent, or Firm* — Merchant & Gould P.C.

(57) ABSTRACT

A method for inserting objects from a 2D image into another environment while keeping the spatial relationships of the objects in the 2D image intact is provided.
A device comprising circuitry configured to carry out the method and a computer program product adapted to carry out the method are also provided.

15 Claims, 6 Drawing Sheets

(56) References Cited

U.S. PATENT DOCUMENTS

| | | |
|---|---|---|
| 2019/0295151 A1 | 9/2019 | Ghadar et al. |
| 2020/0051338 A1* | 2/2020 | Zia et al. |
| 2020/0302681 A1* | 9/2020 | Totty ..................... G06T 19/20 |
| 2021/0383115 A1* | 12/2021 | Alon ..................... B25J 9/1602 |

OTHER PUBLICATIONS

European Search Report for EP Application No. EP 20 16 0241 dated Jul. 22, 2020 (15 pages).
Chen et al. "Image2Scene: Transforming Style of 3D Room." Multimedia (Oct. 13, 2015) pp. 321-330.
Nie et al. "Shallow2Deep: Indoor scene modeling by single image understanding." Pattern Recognition, vol. 103, (Feb. 12, 2020) pp. 1-26.
Chen et al. "Image2Scene: Transforming Style of 3D Room." Multimedia, ACM, Oct. 2015, pp. 312-330.
European Search Report for EP Application No. 20 16 0241 dated Jul. 22, 2020 (15 pages).
Nie et al. "Shallow2Deep: Indoor scesne modeling by single image understanding." Pattern Recognition, vol. 103 (2020), 26 pages.
International Search Report and Written Opinion for International Application No. PCT/EP2021/054123 dated May 21, 2021 (19 pages).
Weiss et al. "Automated Layout Synthesis and Visualization from Images of Interior or Exterior Spaces." IEEE Conf on Computer Visin and Pattern Recognition, (2017), pp. 41-47.

\* cited by examiner

COMPUTER IMPLEMENTED METHOD, A DEVICE AND A COMPUTER PROGRAM PRODUCT FOR AUGMENTING A FIRST IMAGE WITH IMAGE DATA FROM A SECOND IMAGE

CROSS-REFERENCE TO RELATED APPLICATIONS

This application claims benefit of Application No. 20160241.4, filed 28 Feb. 2020 in Europe and which application is incorporated herein by reference in its entirety. To the extent appropriate, a claim of priority is made to the above disclosed application.

TECHNICAL FIELD

The present disclosure relates to the field of image analysis, and in particular, it relates to a method for augmenting a first image using image data from a second image. The disclosure also relates to a device comprising circuitry configured to carry out the method. The disclosure also relates to a computer program product adapted to carry out the method.

BACKGROUND

In image augmentation approaches, it is often desirable to determine and identify which objects are present in an image. However, it is difficult for a machine to determine why the objects are placed in the way they are.

It would be desirable for users to find an image in e.g. a catalogue that they would like to inspire their room and use image augmentation to see how the objects in that image would look like in their room. Typically, an image may be augmented such that a data model of an object may be placed in the image such that a user is able to visualize how the scene would look like with the added model. However, it is difficult for a machine to convert between a 2D image in one scale to e.g. a 3D environment in another scale while keeping the original intent of the 2D image intact.

Therefore, there is room for improvements in the field of image analysis and augmenting of images.

SUMMARY

In view of the above, it is thus an object of the present disclosure to overcome or mitigate at least some of the problems discussed above. In particular, it is an object of the present disclosure to provide a method for inserting objects from a 2D image into another environment while keeping the spatial relationships of the objects in the 2D image intact. Further and/or alternative objects of the present disclosure will be clear for a reader of this disclosure.

According to a first aspect, there is provided a computer implemented method for augmenting a first image with image data from a second image. The method comprises: capturing the first image depicting a first scene using an image capturing device; identifying a key object in the first image; receiving the second image depicting a second scene; identifying a plurality of objects in the second image; determining a first 3D coordinate space of the first image; determining a second 3D coordinate space of the second image; determining an object coordinate for the key object in the first image using the first 3D coordinate space; determining object coordinates for the identified plurality of objects in the second image using the second 3D coordinate space; identifying relationships between the identified plurality of objects in the second image based on the determined object coordinates; matching one of the plurality of objects in the second image with the key object in the first image; receiving a plurality of 3D models from a database, the plurality of 3D models corresponding least some of the plurality of objects in the second image; and inserting the plurality of 3D models into the first image while keeping the identified relationships between the corresponding plurality of objects in the second image to the one matched object in the second image and duplicating said relationships to the key object in the first image using the first 3D coordinate space, thereby rendering an augmented image.

By the term "inserting a plurality of 3D models into the first image" should, in the context of present specification, be understood as adding a visual representation of the 3D models into the first image.

For example, if the first image is a 2D image, which is only one possible embodiment, the 3D model is converted to a 2D image and the visual representation of that 2D image, such as pixels, polygons or vectors, replaces the pixels, polygons or vectors of the first image corresponding to where it is determined it should be placed to give an impression that the 3D scene corresponding to the 2D first image now comprises the object of the 3D model, wherein the identified relationships between the corresponding plurality of objects in the second image to the one matched object in the second image is duplicated to said relationships to the key object in the first image using the first 3D coordinate space. This may comprise rotating or resizing the 3D model before converting it to a 2D image.

If the first image is a 3D image, which is only one possible embodiment, the 3D model may be inserted directly into the first image, possibly involving a conversion to the right type of 3D model.

In either case, by inserting objects from the second image into the first image, the first image is augmented into an augmented image that comprises objects from both images.

By the term "relationship" should, in the context of present specification, be understood as a spatial relationship such as object A being on top of or above object B and/or object B being next to object C, etc.

The first and second 3D coordinate space may extend along an X, Y, Z plane/direction. The 3D coordinate space may be determined through applying an algorithm to the image. It is to be noted that there are many algorithms that may be suitable for calculating and determining a 3D coordinate space. By way of example, the 3D coordinate space may be calculated by applying a Plane detection algorithm, a RANSAC algorithm, a Hough algorithm, etc. to the first and/or second image.

Objects in the second image (i.e. image data pertaining to the corresponding objects of the second scene) may be segmented (extracted, distinguished, etc.) using any known algorithm, such as algorithms using one or more of edge features, binary patterns, directional patterns, Gradient features, Spatio-Temporal domain features, etc.

The steps of identifying objects in the images may be done by an image search algorithm. By the term "image search algorithm" should, in the context of the present specification, be understood as any known way to search for images (of objects) in a database which are similar to an object of the image and use the outcome (e.g. labels/classification of similar images found in the database) to classify the object. The database may be a specific one or found using the internet. Examples of known commercial image search algorithms at the filing of this disclosure comprises Google images, TinEye and Alibabas Pailitao.

The provided method is an improved method for augmenting an image and keeping the augmented image realistic. By keeping the relationships of the objects of the second image intact, a more realistic view of the augmented image may be achieved. A relatively low complexity image augmentation method is thereby achieved by the use of relationships.

By receiving 3D models for the identified objects, the 3D models may be rendered directly into the first image. A low-complexity process for adding image data pertaining to the objects of a second image to a first image may thus be achieved. Further, the 3D models are easier to insert into a 3D environment and results in a more realistic augmented image as they may e.g. be rotated and/or scaled.

According to an embodiment, the step of inserting the plurality of 3D models further comprises replacing the key object in the first image with the 3D model corresponding to the one matched object in the second image.

Replacing the key object is beneficial in that it may require less complex conversions between coordinate spaces when duplicating relationships. Moreover, the particular version of the key object (such as a particular model of a bed, chair etc.) may be rendered into the first object, where it replaces the corresponding key object originally present in the first image (e.g. the bed, chair etc. of another model). This may result in an improved augmented image.

According to an embodiment, the step of inserting the plurality of 3D models comprises replacing at least one identified object in the first image with at least a portion of the plurality of 3D models.

Replacing an identified object is beneficial in that it may require less complex conversions between coordinate spaces when duplicating relationships. Furthermore, replacing may allow for identified objects of the second image to be inserted into the first image in an otherwise occupied optimal position or may ensure that a reasonable amount of each type of object is present in the resulting augmented image. The replacement may be a different type of object or object recognition may be used to replace an object in the first image with a corresponding object from the second image. The replaced object may be the key object or any other object in the first image.

According to an embodiment, the step of identifying a key object in the first image comprises identifying a plurality of objects in the first image and selecting one of the plurality of objects as the key object according to a pre-determined priority.

A pre-determined priority is beneficial in that the selection and subsequent insertion becomes more accurate. It may e.g. be known that specific types of furniture, like a bed or a table, is an important centrepiece of a room and may thus be used as a logical and simple key object to duplicate relationships to other objects from. Alternatively, or additionally, it may be easier to duplicate relationships if focusing on the largest, least mobile object, therefore such objects may have a higher priority. Alternatively, or additionally, it may be easier to duplicate relationships if focusing on the object with the most relationships, therefore such objects may have a higher priority. All of these criteria and more may be weighed against each other at once or sequentially.

According to an embodiment, the step of matching comprises performing object recognition of the key object in the first image and matching the recognized object with metadata of the 3D models corresponding to the identified plurality of objects.

Object recognition is beneficial in that relationships are usually more meaningful and logical if related to the type of object rather than e.g. the size or position of the object. This therefore allows a better and more reliable subsequent insertion. Metadata may be the simplest way to match the recognized object in the first image with the identified plurality of objects in the second image, however alternatives include performing object recognition on the identified plurality of objects in the second image as well. Object recognition comprises conventional algorithms for data and image processing as well as machine learning methods such as neural networks.

According to an embodiment, the step of identifying a plurality of objects in the second image comprises using a computer vision algorithm to segment the second image into different parts and identifying said plurality of objects and empty space in the depicted second scene.

Image segmentation is beneficial in that it allows each object in the image to be individually identified. The identified empty space may further be useful when inserting the plurality of 3D models into the first image, e.g. to fill the empty space or to conserve a set amount of empty space, for example in front of a TV.

According to an embodiment, the relationships between the identified plurality of objects in the second image comprises at least one of: an object is supported by another object; an object is near another object; and an object is to the side of or in front of another object.

The different relationships are beneficial in that they connect the objects in relevant ways that allow for chaining and multiple relationships at once. They are also easy to adapt to a different surrounding or coordinate space.

According to an embodiment, the relationships between the identified plurality of objects in the second image comprises directional information such as that an object is to a specific side of another object, e.g. to the left or in front of another object, and/or relative rotation, i.e. that an object is facing in a particular direction, in relation to either other objects, the floor, ceiling or walls, and the step of inserting at least a portion of the plurality of objects in the second image into the first image comprises adjusting the directional information to fit into the first image.

Directional information is beneficial in that they are more easily manipulated while keeping the logic behind the relationship intact. For example, if there is no room to the left of an object, it may result in a more realistic augmented image if an object originally to the left is placed at the same distance to the right instead of shifting other things around. Further, if e.g. the key object is rotated compared to the corresponding object in the second image, it may result in a more realistic augmented image if the directional information is rotated in the same way.

According to an embodiment, the relationships between the identified plurality of objects in the second image comprises relative and absolute distances to a wall, floor or ceiling of the second scene, and/or between the objects in the second 3D coordinate space; and the step of inserting the plurality of 3D models into the first image comprises prioritizing either the relative or absolute distances according to metadata corresponding to a class of the 3D models when duplicating said relationships to the key object in the first image using the first 3D coordinate space.

Prioritizing different types of distances is beneficial in that different types of objects are affected by different logic. For example, it may be more important to conserve the absolute distance between a chair and a table while it is more logical to conserve the relative distance between a couch and a coffee table. As such, the metadata influences how the different types of distances are prioritized.

According to an embodiment, the step of inserting the plurality of 3D models into the first image may comprise prioritizing either the directional information or the distances according to metadata corresponding to a class of the 3D models when duplicating said relationships to the key object in the first image using the first 3D coordinate space.

Prioritizing either the directional information or the distances according to metadata corresponding to a class of the 3D models in beneficial in that different types of objects are affected by different logic. For example, it may be more important to conserve the distance between a shelf and a painting, rather than to preserve their orientation. According to an embodiment, the prioritization of the different relationship data types according to metadata comprises user preference and/or machine learning methods to decide which of the relationship data types to prioritize when converting between the first and second 3D coordinate space based on the class of the 3D models.

By the term "different relationship data types" should, in the context of present specification, be understood as directional information, such as relative orientation and/or rotation of the object, or distance, such as a relative or absolute distance, to other objects or the ceiling, floor or walls.

Deciding which relationship data type to prioritize based on user preference and/or machine learning methods is beneficial in that it may be difficult to create a predetermined prioritization that will apply objectively in all instances. As such, some external intelligence, which may comprise fetching information previously added to a database such as user settings, may improve the resulting augmented image.

According to an embodiment, the step of identifying relationships between the identified plurality of objects in the second image comprises using machine learning to identify interior design rules and incorporating them to the relationships.

Incorporating interior design rules to the relationships is beneficial in that it results in a more realistic subsequent augmented image.

According to an embodiment, the step of capturing the first image depicting a first scene using an image capturing device comprises using a mixed reality device as an image capturing device and wherein the method further comprises displaying the augmented image using the mixed reality device and updating the augmented image in real time as the field of view of the mixed reality device changes.

Updating the augmented image in real time is beneficial in that it allows a user to look around as they would in real life, resulting in a more immersive and realistic augmented image.

According to an embodiment, the method further comprises a step of storing the augmented image in a memory.

The storing step is beneficial in that it allows a user to easily compare different layouts and designs and more easily distribute them to interested parties.

According to a second aspect there is provided a computer program product comprising a computer-readable storage medium with instructions adapted to carry out the method of the first aspect when executed by a device having processing capabilities.

According to a third aspect there is provided a device for displaying a first image augmented with image data from a second image. The device comprises circuitry being configured to: capture the first image depicting a first scene using an image capturing device; identify a key object in the first image; receive the second image depicting a second scene; identify a plurality of objects in the second image; determine a first 3D coordinate space of the first image; determine a second 3D coordinate space of the second image; determine an object coordinate for the key object in the first image using the first 3D coordinate space; determine object coordinates for the identified plurality of objects in the second image using the second 3D coordinate space; identify relationships between the identified plurality of objects in the second image based on the determined object coordinates; match one of the plurality of objects in the second image with the key object in the first image; receive a plurality of 3D model from a database, the 3D model corresponding to at least some of the plurality of objects in the second image; insert the plurality of 3D models into the first image while keeping the identified relationships between the corresponding plurality of objects in the second image to the one matched object in the second image and duplicating said relationships to the key object in the first image using the first 3D coordinate space, thereby rendering an augmented image; and display the augmented image.

The second and third aspect may generally have the same features and advantages as the first aspect.

Generally, all terms used in this disclosure are to be interpreted according to their ordinary meaning in the technical field, unless explicitly defined otherwise herein. All references to the word "comprising" does not exclude other elements or steps, and the indefinite articles "a/an/the (element, device, component, means, step, etc)" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings, where the same reference numerals will be used for similar elements, wherein.

DETAILED DESCRIPTION

The present disclosure will now be described more fully hereinafter with reference to the accompanying drawings, in which currently preferred embodiments are shown. There are additional embodiments, however, that can take many different forms and the present disclosure should not be construed as limited to the embodiments set forth herein; rather, these embodiments are provided for thoroughness and completeness, and fully convey the scope of the present disclosure to the skilled person.

Figure 1:
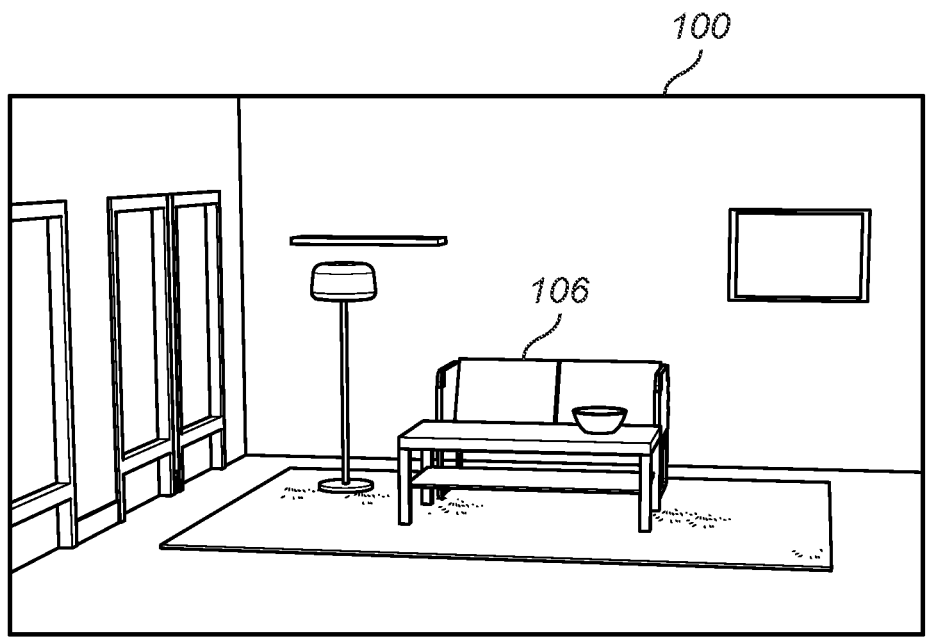
FIG. 1 is a schematic illustration of a first image according to an embodiment.
Figure 2:
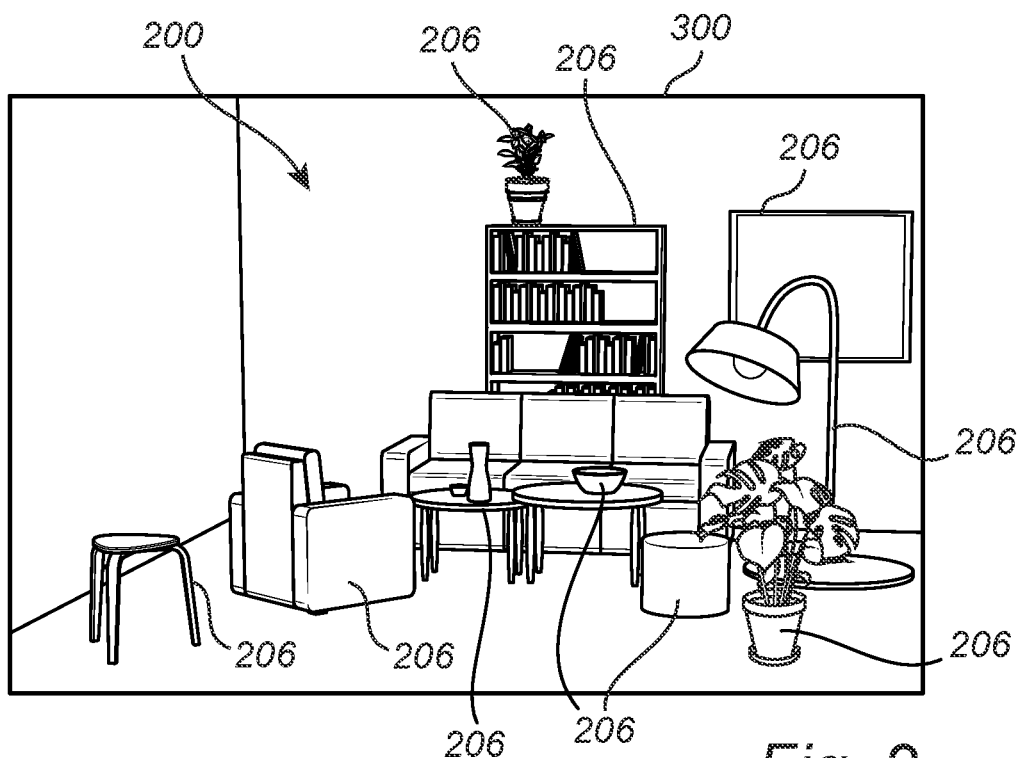
FIG. 2 is a schematic illustration of a second image according to an embodiment.

In the following, a method will be described for augmenting a first image 100 (FIG. 1) with image data from a second image 300 (FIG. 2). This method is computer implemented on any device with circuits having processing capability, such as a computer with a CPU. The method is described as a number of steps in a specific sequence, however it should be clear from the following disclosure that the sequence described is merely one possible embodiment. Further, some steps may be skipped, occur simultaneously and/or be performed using different units or circuits.

Figure 3:
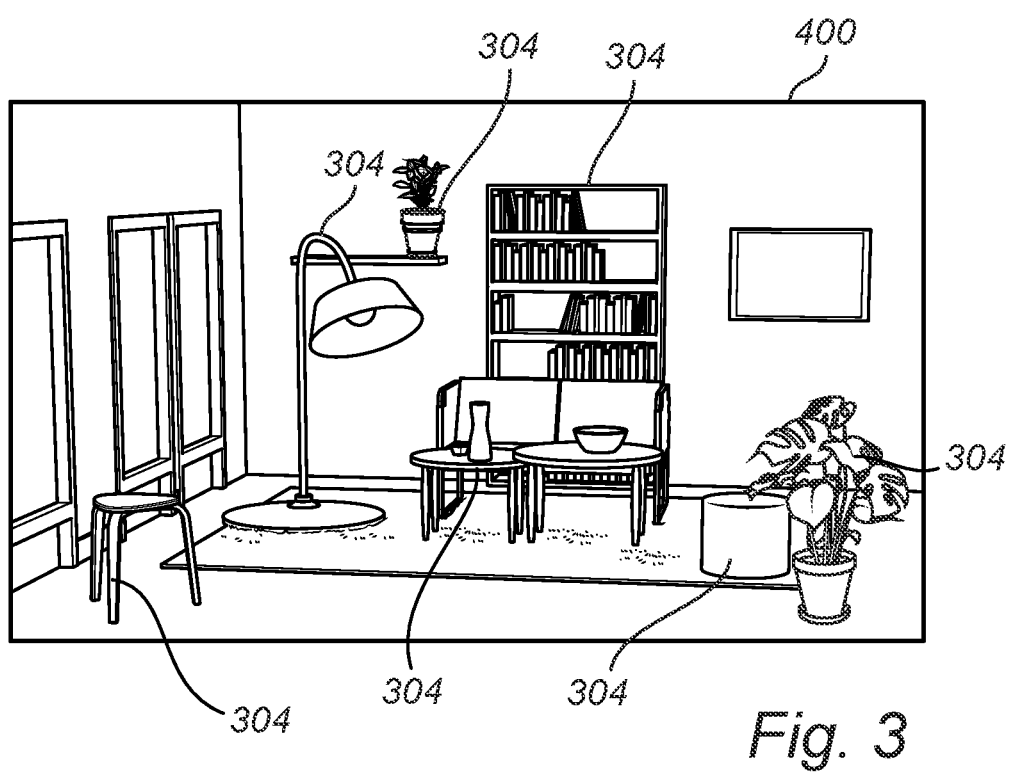
FIG. 3 is a schematic illustration of an augmented image according to an embodiment.

In short, the method comprises identifying objects 106, 206 of the two images 100, 300, identifying relationships between at least the objects 206 in the second image 300 and inserting at least some of the objects 206 from the second image 300 into the first image 100 in a realistic manner using the identified relationships, thereby rendering an augmented image 400 (FIG. 3).

The following disclosure will focus on an embodiment where the first image 100 depicts a first scene being in a home of a user and the second image 300 depicts a second scene 200 representing a setting more desirable to the user. The second image 300 may e.g. be an image in a catalogue depicting an ideal room created by professional designers. The second image 300 may also be a room in a previous home that the user wants to substantially recreate in an unfurnished new house. In this case, the size and fixed features of the new house may cause this recreation to be non-trivial. In either case, the inventors have realised that the exact items in the second image 300 may be less important than their relationships to each other, i.e. the use of empty space, which furniture types fit together and the use of decorations.

The augmented image 400 resulting from the method may therefore be used to decorate a more desirable room in a more efficient manner, both in terms of requiring fewer purchases by focusing less on the objects than prior art methods and by utilising the objects and features already present in the first scene. The result is further tailored specifically to the room and situation of the user and therefore results in a more accurate and realistic result.

It should be noted that even though the described embodiments will focus on furnitures for the sake of clarity, the inventive concepts set out in the attached claims may be implemented in any number of ways, e.g. factory optimisation or city planning.

FIG. 1 discloses a schematic illustration of a first image 100 according to an embodiment. The first image 100 depicts a first scene captured by an image capturing device 102. The first scene is a room in the home of a user and may be captured by the user to set out the scene as one that the user is at least curious of how it might be changed. The image capturing device 102 may be any suitable device, such as a camera, smartphone, scanning device or mixed reality headset.

The first image 100 may be two-dimensional, three-dimensional or a set of two-dimensional images together forming a three-dimensional impression. It may depict a real world scene or be computer-generated.

The first image 100 is processed by a processing circuit in the following manner, e.g. by the image capturing device 102 directly or by first being transmitted to a separate unit using communication means known to the skilled person.

A key object 106 is identified in the first image 100, which corresponds to the object in the image which relationships are most important for the essence of the room. For the example of FIG. 1, the sofa is the key object 106. In a bedroom, the bed will usually be the key object 106.

A plurality of objects in the first image 100 may be identified and one selected as the key object 106. Identifying objects in the first image 100 may be done by an image search algorithm. The selection of one object as the key object 106 may be according to a pre-determined priority. This pre-determined priority may be a pre-determined list, e.g. based on user preferences.

A pre-determined priority is beneficial in that the selection and subsequent insertion becomes more accurate. It may e.g. be known that specific types of furniture, like a bed or a table, is an important centrepiece of a room with relationships to other objects that are logical and simple to duplicate.

Alternatively, the key object 106 may be identified without concern of the other objects in the first image 100 by using methods independent of other objects.

The key object 106 may be determined based on the size, location and/or type of the object. For example: a bed my be generally recognized as the key object 106 in any room where it is present; a large object may be identified as the key object 106 either because of its commanding prescense or because of the difficulty required for moving it; alternatively an object in the center of the room or frame may be selected as the key object 106 simply because the user seems to consider it important. All of these considerations and more may be combined using different weighting and prioritisation of the different criteria.

It may be easier to duplicate relationships if focusing on the largest, least mobile object, therefore such objects may have a higher priority. Alternatively, or additionally, it may be easier to duplicate relationships if focusing on the object with the most relationships, therefore such objects may have a higher priority. All of these criteria and more may be weighed against each other at once or sequentially.

In one embodiment, a secondary key object to replace the key object 106 is selected in case the key object 106 is not usable, e.g. due to not being able to match an object 206 in the second image 300 or due to not being able to duplicate the relationships of the key object 106. The secondary key object is preferably chosen as the next best object in the first image 100 according to any of the above identified priorities.

In another embodiment, a secondary key object is used in conjunction with the key object 106 during the inserting step S24, requiring the device performing the method to duplicate the relationships to both the secondary key object and the key object 106.

A first 3D coordinate space is determined for the first image 100, which is used for determining an object coordinate of the key object 106. The first 3D coordinate space allows objects in a two-dimensional first image 100 to be processed in three dimensions, which results in a more accurate augmented image 400.

The first 3D coordinate space may be determined using image processing of the first image 100. In the case of the first image 100 being three-dimensional, for example captured using AR/VR equipment, the 3D coordinate space may be directly extracted from metadata of the first image 100. In the case of the first image 100 being a two-dimensional capture of a three-dimensional first scene, the 3D coordinate space may be determined e.g. by analysing shadows or relative sizes of the objects in the first image 100. In the case of the first image 100 being a set of two-dimensional images at different angles, the different angles may be used to determine the 3D coordinate space. Any known and suitable way of determining the 3D coordinate space may be employed.

The first 3D coordinate space may extend along an X, Y, Z plane/direction. The 3D coordinate space may be determined through applying an algorithm to the first image 100. It is to be noted that there are many algorithms that may be suitable for calculating and determining a 3D coordinate space. By way of example, the 3D coordinate space may be calculated by applying a Plane detection algorithm, a RANSAC algorithm, a Hough algorithm, etc. to the first image 100.

FIG. 2 discloses a schematic illustration of a second image 300 according to an embodiment. The second image 300 depicts a second scene 200 that may or may not be real. The second scene 200 may be a room more desirable to the user than the first scene, such that an augmented version of the first scene with desirable elements (e.g. objects 206 and/or relationships of objects 206) from the second scene 200 may be displayed as an augmented image 400. In the following, the second image 300 will be described as an image in a furniture catalogue, under the assumption that a professionally curated image in a catalogue is likely to be desirable to a large number of users.

The second image 300 is processed by a processing circuit in the following manner, e.g. by the image capturing device 102 directly or by first being transmitted to a separate unit using communication means known to the skilled person.

A plurality of objects 206 are identified in the second image 300. Objects in the second image 300 may be segmented (extracted, distinguished, etc.) using any known algorithm, such as algorithms using one or more of edge features, binary patterns, directional patterns, Gradient features, Spatio-Temporal domain features etc.

Objects in the second image 300 may be identified using an image search algorithm. This may or may not be done after the image has been segmented.

The plurality of objects 206 in the second image 300 may be identified using a computer vision algorithm to segment the second image 300 into different parts and identifying said plurality of objects 206 and empty space in the depicted second scene 200.

All object in the second image 300 do not need to be identified and some selection may be made regarding what is identified, e.g. windows may be ignored.

A second 3D coordinate space is determined for the second image 300. The second 3D coordinate space is used for determining objects coordinates for the identified plurality of objects 206. The second 3D coordinate space allows objects 206 in a two-dimensional second image 300 to be processed in three dimensions, which results in a more accurate identification of their relationships, which will be described in more detail below.

The second 3D coordinate space may be determined using image processing of the second image 300. In the case of the second image 300 being three-dimensional, the 3D coordinate space may be directly extracted from metadata of the second image 300. In the case of the second image 300 being a two-dimensional capture of a three-dimensional second scene 200, the 3D coordinate space may be determined e.g. by analysing shadows or relative sizes of the objects in the second image 300. In the case of the second image 300 being a set of two-dimensional images at different angles, the different angles may be used to determine the 3D coordinate space.

The second 3D coordinate space may be determined for the second image 300. By determining the second 3D coordinate space, an object coordinate may be determined for the identified objects 206 in the second 3D coordinate space. The second 3D coordinate space may be determined as described above for the first 3D coordinate space.

Relationships are identified between the identified plurality of objects 206 in the second image 300 based on the determined object coordinates. The relationships are used to ensure that the objects 206 are inserted into the first image 100 in a realistic and desirable manner. It is assumed that the objects 206 in the second scene 200 are arranged relative to each other in a particular manner, as such it is desirable to replicate the relationships.

The relationships between the identified plurality of objects 206 in the second image 300 may comprise an object is supported by another object; an object is near another object; and/or an object is to the side of or in front of another object. Similar relationships may be identified in relation to the floor, ceiling and/or wall(s) of the room. These may be combined with inter-object relationships.

This is a non-exhaustive list of relevant relationships for furniture, however other relationships may be more or less relevant depending on different embodiments.

The different relationships are beneficial in that they connect the objects 206 in relevant ways that allow for chaining and multiple relationships at once. They are also easy to adapt to a different surrounding or coordinate space.

A typical example of chaining is a vase standing on a plate standing on a table, the table being next to a couch.

The relationships may further comprise directional information, e.g. that an object is to the left of another object and/or facing in a particular direction. This may be used to orient certain objects correctly or to rotate or mirror objects that otherwise would not be able to fit into the augmented image 400.

In order to keep the identified relationships between the plurality of objects 206 in the second image 300 to the one matched object in the second image 300 when inserting the corresponding plurality of 3D models into the first image 100, the directional information of the relationships may be altered in a manner corresponding to differences in the orientation and rotation of the key object 106 in the first image 100 compared to the matched one of the plurality of objects 206 in the second image 300.

For example, if the key object is rotated compared to the corresponding object in the second image, it may result in a more realistic augmented image if the directional information is rotated in the same way. If a nightstand of the second image 300 is set to the left of a bed, it may be kept to the left a corresponding bed, e.g. being the key object 106, when inserting it into the first image 100. However, if there is no room to the left of an object, it may result in a more realistic augmented image if an object originally to the left is placed at the same distance to the right instead of shifting other things around. In this case, the distances of the relationships are given higher priority than the directional information.

The relationships may comprise relative and absolute distances to a wall, floor or ceiling of the second scene, and/or between the objects 206 in the second 3D coordinate space.

Prioritizing different types of distances is beneficial in that different types of objects are affected by different logic. For example, it may be more important to conserve the absolute distance between a chair and a table while it is more logical to conserve the relative distance between a sofa and a coffee table. As such, the type of object influences how the different types of distances are prioritized.

Identifying relationships may comprise using machine learning to identify interior design rules and incorporating them to the relationships. Machine learning may comprise any machine learning algorithm such as a decision tree, neural network and/or classifier.

Interior design rules may be any suitable heuristic for placing furniture in a room; such as having a chair in front of a table or empty space in front of a TV; or placing similar or complimentary colour schemes together. This results in a more realistic and/or more appealing augmented image 400.

In one embodiment, identifying relationships comprises receiving pre-determined relationships stored as metadata relating to the second image 300.

One of the plurality of objects 206 in the second image 300 is matched with the key object 106 in the first image 100. The matching allows the two images 100, 300 to have a link between them, which will serve to facilitate the inserting step S24.

The matched object is preferably of a similar type as the key object 106, e.g. both being a couch as in FIGS. 1 & 2. They do not have to be perfectly matched however, e.g. a couch may be matched with a chair, where the matching is done based on a functionality or base type of objects (e.g. seating furniture) rather than a specific identity of the objects.

The matching may be based on a similar metric as the identification of the key object 106 in the first image 100. This may comprise matching the most cetralised objects or the largest objects instead of the same types of object.

The matching may comprise performing object recognition of the key object 106 in the first image 100 and matching the recognized object with metadata of the identified plurality of objects 206. In this case, the metadata comprises information relating to the type of object that has been identified.

Object recognition is beneficial in that relationships are usually more meaningful and logical if related to the type of object rather than e.g. the size or position of the object. This therefore allows a better and more reliable subsequent insertion. Metadata is the simplest way to match the recognized object in the first image 100 with the identified plurality of objects 206 in the second image 300, however alternatives include performing object recognition on the identified plurality of objects 206 in the second image 300 as well. Object recognition comprises conventional algorithms for data and image processing as well as machine learning methods such as neural networks.

In one embodiment, more than one of the plurality of objects 206 in the second image 300 is matched with the key object 106 in the first image 100. In this case, the relationships of all of the matched objects are duplicated in the augmented image 400. This may further be combined with an embodiment with several key objects 106 and/or a secondary key object.

The processing circuit receives a plurality of 3D models 304 are from a database, whereby the plurality of 3D models 304 correspond to at least some of the plurality of objects 206 in the second image 300.

3D models 304 are easier to insert into a 3D environment and results in a more realistic augmented image 400 as they may e.g. be rotated and/or scaled. Moreover, the 3D models 304 may be easily rendered with high quality into the augmented image 400 using any known rendering algorithm.

Further, the database comprising the 3D models 304 may further comprise metadata of the 3D models 304 corresponding to the identified objects 206. This data may e.g. comprise the type of furniture or what variations in e.g. color may be available.

The database is preferably previously established and filled with data and models relevant to the embodiment. In one embodiment, the database may be updated if an object 206 in the second scene 200 is not found there.

There may be more than one 3D model 304 that corresponds to an identified object 206 in the second image 300. In this case, one is selected according to user preferences, user selection, machine learning, availability and/or data relating to previous selections. In the case of availability, if one 3D model 304 corresponds to an item that is more easily available than another (e.g. having more items in stock, being in a more suitable price range for the user or the other item has been discontinued), the more available one may be automatically selected. In the case of data relating to previous selections, 3D models 304 that have been popular for previous users may be automatically selected.

A sub-group of the plurality of objects 206 in the second image 300 may be selected as the ones to include in the augmented image 400. Thus only 3D models 304 corresponding to some of the plurality of objects 206 in the second image 300 may be received.

The selection of the sub-group of objects 206 may be made according to user preferences, user selection, machine learning, availability and/or data relating to previous selections.

The selection of the sub-group of objects 206 may further be at least semi-random, such that at least one of the objects 206 in the group is added by chance. Different objects may have different odds of being included in the sub-group, which may be influenced by any or all of the selection criteria in the preceding paragraph. A user may re-randomize the sub-group until a satisfactory augmented image 400 is achieved.

A similar randomization may apply for which of a plurality of suitable 3D models 304 to receive. These may also be re-randomized to allow for a different 3D model 304 in the augmented image 400.

The 3D models 304 may be used in combination with image segmentation. The image segmentation may then be improved such that only, or almost only, the image data pertaining to the identified object 206 is extracted, and such that all or almost all image data pertaining to the identified object 206 is extracted. The received 3D model 304 is thus used to decide which part of the second image 300 to extract image data from to avoid extracting any surrounding of the object 206. This may improve the augmented image 400 by improving the realism of the image in an efficient manner.

FIG. 3 shows a schematic illustration of an augmented image 400 according to an embodiment. The augmented image 400 shows the room from the first image 100 (FIG. 1) augmented with 3D models 304 corresponding to objects 206 in the second image 300 (FIG. 2). The resulting image 400 represents a more desirable room, wherein the desirability is established according to the teachings of the second image 300. The augmented image 400 may be presented to the user in 2D or 3D, e.g. displayed on a screen or in a mixed reality device.

The plurality of 3D models 304 are inserted into the first image 100 while keeping the identified relationships between the corresponding plurality of objects 206 in the second image 300 to the one matched object in the second image 300 and duplicating said relationships to the key object 106 in the first image 100 using the first 3D coordinate space, thereby rendering an augmented image 400.

Some 3D models 304 replace objects from the first image 100 in the augmented image 400, such as the lamp and coffee table. Other objects are added compared to the first image 100, such as the bookshelf and the plants.

Note that the single coffee table of the first image 100 is replaced by two coffee tables in the augmented image 400 according to a teaching of the second image 300. The relationships and/or metadata of the coffee tables allow the processing circuit to identify that they are the same type of object as the coffee table in the first image 100, and may therefore replace it. Hence, the number of objects does not need to be the same for a match of item types to be established.

A relationship of the bowl being on top of a coffee table is present in both the first and second images 100, 300. Hence, this relationship is duplicated in the augmented image 400 even though the coffee table has changed.

The small potted plant has a relationship that it is on top of a bookshelf in the second image 300. As such, this relationship is duplicated when inserted into the first image 100 resulting in the augmented image 400, however, the plant being supported by a bookshelf in the first image 300 has been replaced with being supported by a shelf in the augmented image 400. Duplicating the relationships does not only comprise copying them directly, as sometimes an equivalent relationship may be achieved using different combinations of items. In this case, the relationship being that the plant is supported by something close to the wall and above the couch.

The lamp has the same position relative to the couch as in the first image 100, which is mirrored compared to the second image 300. Duplicating the relationships does not only comprise copying them directly, as sometimes rotating or mirroring the distances may still conserve the general idea of the relationship. In this case, the relationship being that the lamp is next to the couch is duplicated.

The stool was most closely related to the armchair in the second image 300, however, as the armchair was not inserted into the augmented image 400 the stool may simply be inserted into the augmented image 400 in an empty space in a similar position compared to the key object 106 as this has been deemed by the processing circuit to best conserve the relationships of the stool.

The painting in the first image 100 remains in the augmented image 400 even though another painting is available in the same place in the second image 300. This may be the result of randomness or space limitation, however it may further be excluded from being replaced because of its type of furniture being identified as a painting. The processing circuit may be pre-programmed or learn through machine learning that paintings are usually not desirable to replace.

While not shown in FIG. 3, the step of inserting S24 the plurality of 3D models 304 may further comprise replacing the key object 106 in the first image 100 with the 3D model 304 corresponding to the one matched object in the second image 300.

Replacing the key object 106 is beneficial in that it may require less complex conversions between coordinate spaces when duplicating relationships. Further, the key object 106 may be as important for the second image 300 as for the first image 100 and by replacing it, the desirability of the second image 300 may be transferred more fully to the augmented image 400.

The step of inserting S24 the plurality of 3D models 304 may comprise replacing identified objects in the first image 100 with at least a portion of the plurality of 3D models 304.

This may comprise using the same matching method as described in relation to the matching in FIG. 2.

Replacing identified objects is beneficial in that it may require less complex conversions between coordinate spaces when duplicating relationships. Furthermore, replacing may allow for identified objects 206 of the second image 300 to be inserted into the first image 100 in an otherwise occupied optimal position or may ensure that a reasonable amount of each type of object is present in the resulting augmented image 400. The replacement may be a different type of object or object recognition may be used to replace an object in the first image 100 with a corresponding object from the second image 300.

The step of inserting S24 the plurality of 3D models 304 into the first image 100 may comprise prioritizing either the relative or absolute distances according to metadata corresponding to a class of the 3D models 304 when duplicating said relationships to the key object 106 in the first image 100 using the first 3D coordinate space.

Prioritizing different types of distances is beneficial in that different types of objects are affected by different logic. For example, it may be more important to conserve the absolute distance between a chair and a table while it is more logical to conserve the relative distance between a couch and a coffee table. As such, the metadata influences how the different types of distances are prioritized.

The metadata may comprise an identification of the type of furniture the 3D model 304 relates to, which may in turn be used according to e.g. user preferences and/or machine learning to prioritize, e.g. such that a painting uses absolute distance to floor and a couch uses relative distances to other furniture.

The prioritization of either the relative or absolute distances according to metadata may comprise user preference and/or machine learning methods to decide which of the relative or absolute distances to prioritize when converting between the first and second 3D coordinate space based on the class of the 3D models 304.

Deciding which distance to prioritize based on user preference and/or machine learning methods is beneficial in that it may be difficult to create a predetermined prioritization that will apply objectively in all instances. As such, some external intelligence, which may comprise fetching information previously added to a database such as user settings, may improve the resulting augmented image 400.

Figure 4:
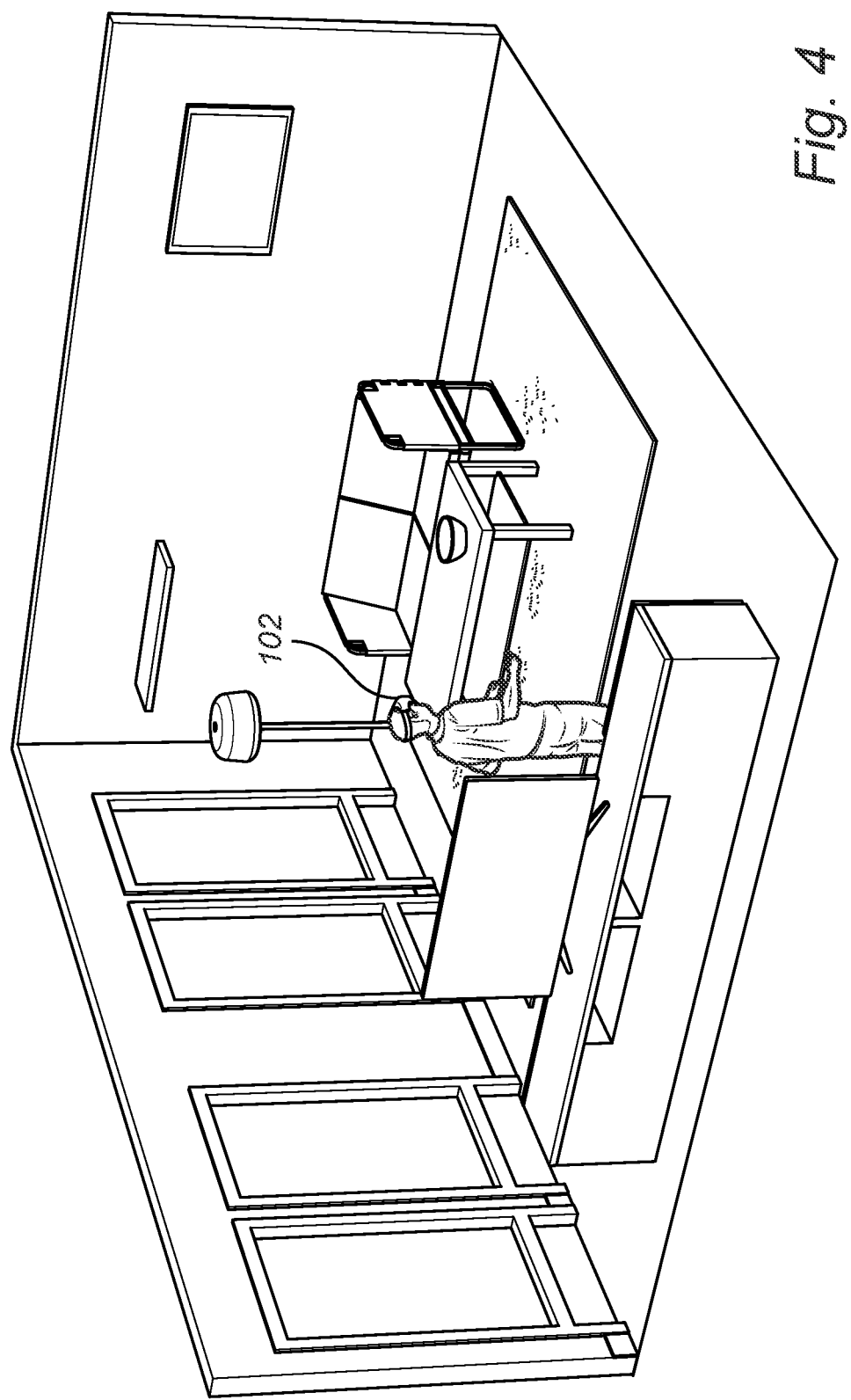
FIG. 4 is a schematic illustration of a first scene according to an embodiment.

FIG. 4 shows schematic illustration of a first scene according to an embodiment. FIG. 4 shows a user capturing S02 the first image 100 depicting the first scene using a mixed reality device (i.e. a VR or AR headset) as an image capturing device 102.

The processing circuit may be configured to display the augmented image 400 using the mixed reality device and updating the augmented image 400 in real time as the field of view of the mixed reality device changes.

As such, if the user turns around the augmented image 400 will change and 3D models 304 corresponding to objects 206 from the second image 300 will be inserted to the new first image 100. For example, a bookshelf may be out of the field of view of the image capturing device 102 in FIG. 4 but still in the room. Once the bookshelf enters the field of view and becomes a part of the first image 100, the augmented image 400 may show the potted plant from the second image 300 on top of the bookshelf.

Updating the augmented image 400 in real time is beneficial in that it allows a user to look around as they would in real life, resulting in a more immersive and realistic augmented image 400.

Information from the first image 100 may be stored in a memory as the field of view of the mixed reality device changes. This may then be used to make the augmented image 400 more realistic by e.g. ensuring that a correct number of objects for each furniture type is present in the room; or by moving an object already present in the first scene to a different place according to relationships identified in the second image 300. Using the bookshelf example as above, once a bookshelf is identified as being present in the room, a bookshelf is no longer inserted into the augmented image 400 without also removing the bookshelf already there; and the bookshelf already present may be moved instead of inserting a new bookshelf from the second scene 200.

The second image 300 may be pre-selected such that the augmented image 400 is created as soon as the image capturing device 102 is activated. Alternatively, a second image 300 to use as a reference of desirability may be automatically selected according to a priority list and/or machine learning. This selection is preferably informed by at least the key object 106 identified in the first image 100, such that a relevant second image 300 is selected. For example, if a toilet is identified in the first image 100, a second image 300 depicting a second scene 200 being a bathroom is automatically selected.

If the user is not happy with the second image 300 after seeing the resulting augmented image 400, a new second image 300 may be selected e.g. randomly or using a menu.

The image capturing device 102 will now be exemplified in conjunction with FIGS. 1-3 and 7.

The image capturing device 102 may be a device for displaying a first image 100 augmented with image data from a second image 300, the device comprising circuitry being configured to: capture S02 the first image 100 depicting a first scene using an image capturing device 102; identify S04 a key object 106 in the first image 100; receive S06 the second image 300 depicting a second scene 200; identify S08 a plurality of objects 206 in the second image 300; determine S10 a first 3D coordinate space of the first image 100; determine S12 a second 3D coordinate space of the second image 300; determine S14 an object coordinate for the key object 106 in the first image 100 using the first 3D coordinate space; determine S16 object coordinates for the identified plurality of objects 206 in the second image 300 using the second 3D coordinate space; identify S18 relationships between the identified plurality of objects 206 in the second image 300 based on the determined object coordinates; match S20 one of the plurality of objects 206 in the second image 300 with the key object 106 in the first image 100; receive S22 a plurality of 3D model 304 from a database, the 3D model corresponding to at least some of the plurality of objects 206 in the second image; insert S24 the plurality of 3D models 304 into the first image 100 while keeping the identified relationships between the corresponding plurality of objects 206 in the second image 300 to the one matched object in the second image 300 and duplicating said relationships to the key object 106 in the first image 100 using the first 3D coordinate space, thereby rendering an augmented image 400; and display S26 the augmented image 400.

Figure 5:
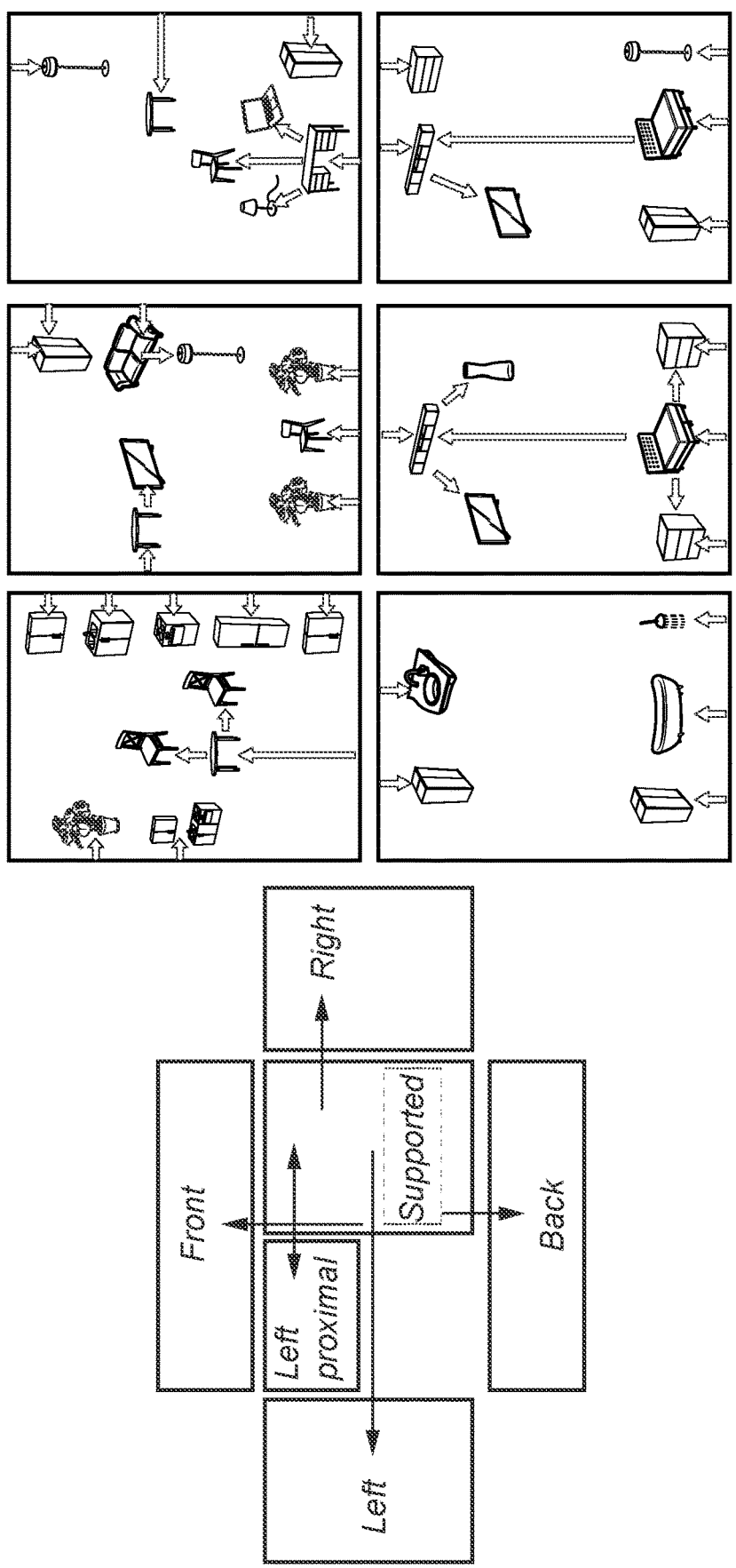
FIG. 5 is a schematic chart of different types of relationships between a plurality of objects according to an embodiment.

FIG. 5 is a schematic chart of different types of relationships between a plurality of objects 206 according to an embodiment. Directional relationships are represented by single arrows, proximal relationships are represented by double arrows and supporting relationships are represented by dashed lines.

Further, examples of different room relationships are given according to an embodiment of relationship representation. For example, a kitchen is shown with a table far away from walls with chairs next to it and the other furniture are all adjacent to the walls. A bedroom is shown with a bed next to one wall with bedside tables at either side and an entertainment unit at the opposite wall with a TV on it.

Figure 6:
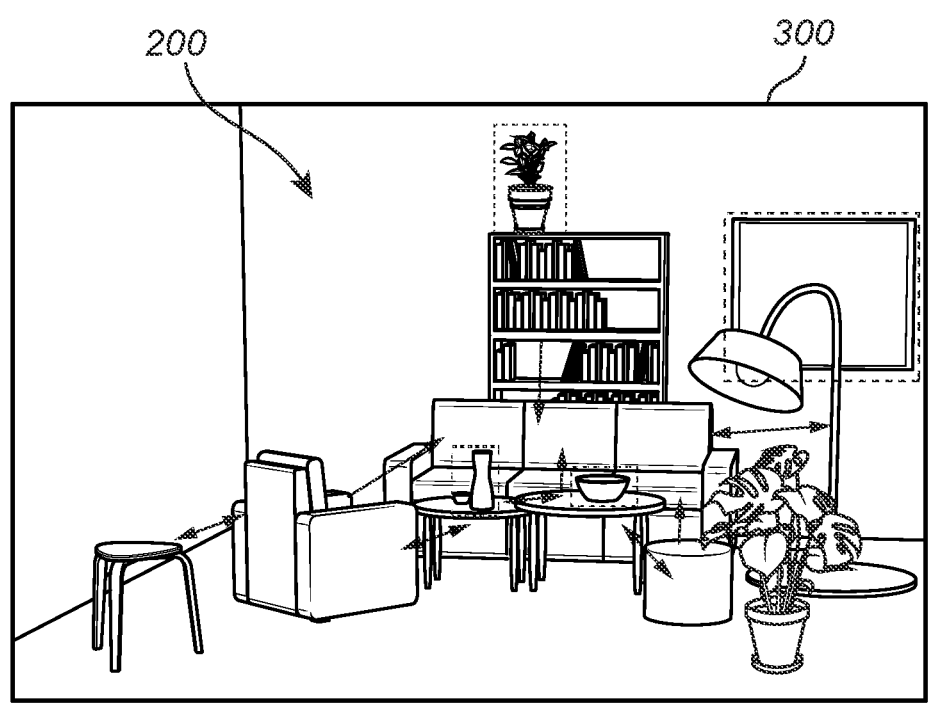
FIG. 6 is a schematic illustration of relationships between a plurality of objects in the second image according to an embodiment.

FIG. 6 shows a schematic illustration of relationships between a plurality of objects 206 in the second image 300 according to an embodiment. Directional relationships are represented by single arrows, proximal relationships are represented by double arrows and supporting relationships are represented by dashed lines.

Most of the relationships shown are the ones relating to the key object 106. In general, the key object 106 will have the most relationships, however this is not always the case.

The bookshelf is behind the couch and supports a potted plant. The foot rest is in front of the couch and next to one of the coffee tables. The stool is next to the armchair. The free-standing plant does not have any relationships identified and may therefore be added to fill any empty space. The painting is only supported by the wall and has no other relationships.

Figure 7:
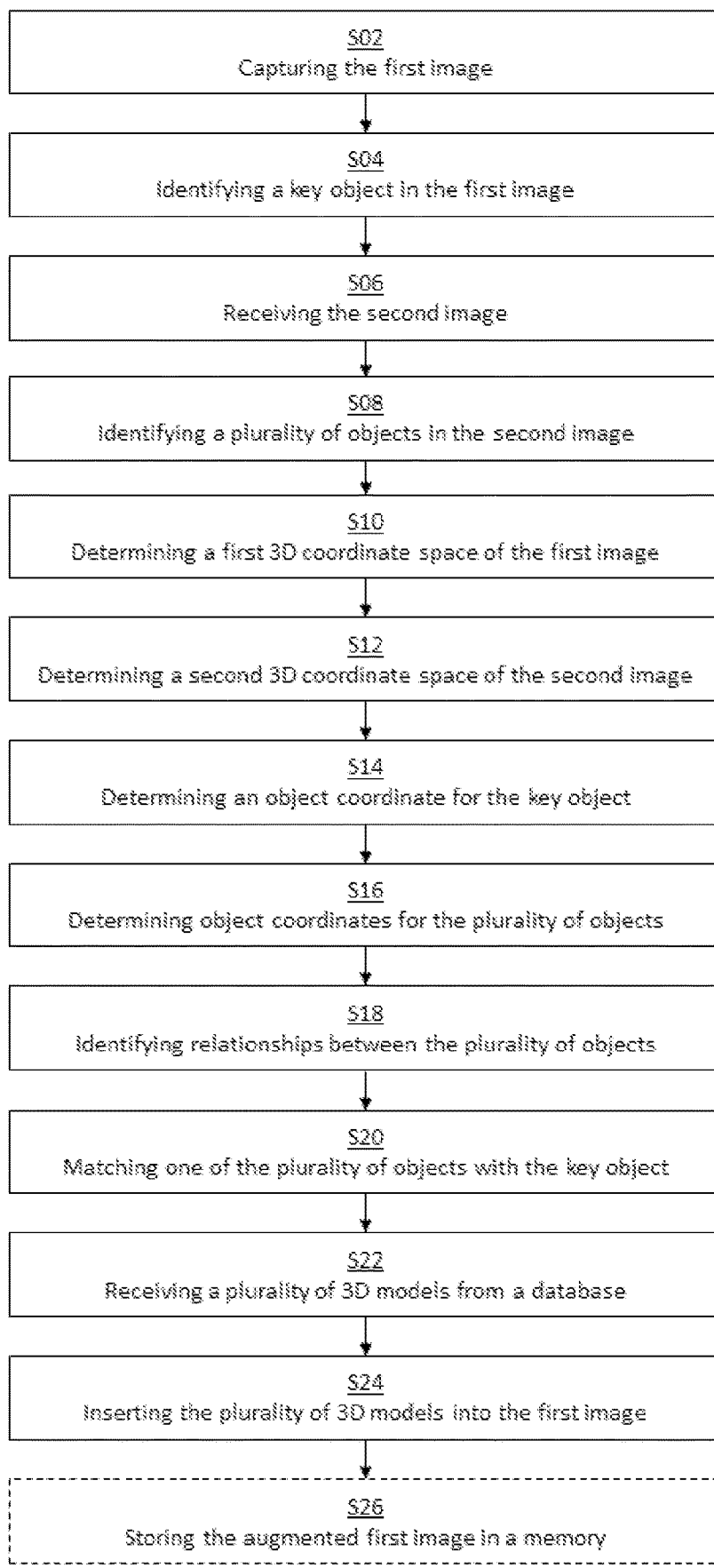
FIG. 7 is a schematic flowchart of a method for augmenting a first image according to an embodiment.

FIG. 7 is a schematic flowchart of a method for augmenting a first image 100 according to an embodiment. The method comprises a number of steps, some of which are optional. The steps may be performed by any number of devices and units, including one. While a specific order of the steps is shown, the steps may be performed in a different order. For example, the receiving step S22 may be performed at any point after the step of identifying S08 a plurality of objects 206 in the second image 300.

The first shown step is a capturing step S02 that comprises capturing the first image 100 depicting a first scene using an image capturing device 102. The captured image 100 may be transmitted or processed by the image capturing device 102.

Next an identifying step S04 is shown that comprises identifying a key object 106 in the first image 100. This step S04 may be performed by any processing circuit. Image processing and/or metadata may be used during this step.

Then comes a receiving step S06 that comprises receiving the second image 300 depicting a second scene 200. This step S06 may be performed by a receiver or an image capturing device 102. The second image 300 may be selected by the user.

Next is an identifying step S08 that comprises identifying a plurality of objects 206 in the second image 300. This step S08 may be performed by any processing circuit. Image processing and/or metadata may be used during this step.

Next is a determining step S10 that comprises determining a first 3D coordinate space of the first image 100. This step S10 may be performed by any processing circuit. Image processing and/or metadata may be used during this step.

Next is a determining step S12 that comprises determining a second 3D coordinate space of the second image 300. This step S12 may be performed by any processing circuit. Image processing and/or metadata may be used during this step.

Next is a determining step S14 that comprises determining an object coordinate for the key object 106 in the first image 100 using the first 3D coordinate space. This step S14 may be performed by any processing circuit. Image processing and/or metadata may be used during this step.

Next is a determining step S16 that comprises determining object coordinates for the identified plurality of objects 206 in the second image 300 using the second 3D coordinate space. This step S16 may be performed by any processing circuit. Image processing and/or metadata may be used during this step.

Next is an identifying step S18 that comprises identifying relationships between the identified plurality of objects 206 in the second image 300 based on the determined object coordinates. This step S18 may be performed by any processing circuit. Image processing and/or metadata may be used during this step.

Next is a matching step S20 that comprises matching one of the plurality of objects 206 in the second image 300 with the key object 106 in the first image 100. This step S20 may be performed by any processing circuit. Image processing and/or metadata may be used during this step.

Next is a receiving step S22 that comprises receiving a plurality of 3D models 304 from a database, the plurality of 3D models 304 corresponding to at least some of the plurality of objects 206 in the second image 300. The database is preferably pre-populated.

Next is an inserting step S24 that comprises inserting the plurality of 3D models 304 into the first image 100 while keeping the identified relationships between the corresponding plurality of objects 206 in the second image 300 to the one matched object in the second image 300 and duplicating said relationships to the key object 106 in the first image 100 using the first 3D coordinate space, thereby rendering an augmented image 400. The augmented image 400 may then be displayed or transmitted to be displayed by a display, such as a virtual reality or alternate reality headset.

The method may further comprise a step of storing S26 the augmented image 400 in a memory. The storing step S26 is beneficial in that it allows a user to easily compare different layouts and designs and more easily distribute them to interested parties. The memory may be any short-term or long-term computer storage media as is known in the art.

The method may be implemented using a computer program product comprising a computer-readable storage medium with instructions adapted to carry out the method when executed by a device having processing capabilities.

The person skilled in the art realizes that the present disclosure is by no means limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. The mere fact that certain measures are recited in mutually different dependent claims does not indicate that a combination of these measured cannot be used to advantage.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks, DVD, or other optical disk storage, magnetic cassettes, magnetic tape, magnetic disk storage or other magnetic storage devices, or any other medium which can be used to store the desired information, and which can be accessed by a computer. Further, it is well known to the skilled person that communication media typically embodies computer readable instructions, data structures, program modules or other data in a modulated data signal such as a carrier wave or other transport mechanism and includes any information delivery media.

What is claimed is:

1. A computer implemented method for augmenting a first image with image data from a second image, the method comprising:
    capturing the first image depicting a first scene using an image capturing device;
    identifying a key object in the first image;
    receiving the second image depicting a second scene;
    identifying a plurality of objects in the second image;
    determining a first 3D coordinate space of the first image;
    determining a second 3D coordinate space of the second image;
    determining an object coordinate for the key object in the first image using the first 3D coordinate space;
    determining object coordinates for the identified plurality of objects in the second image using the second 3D coordinate space;
    identifying relationships between the identified plurality of objects in the second image based on the determined object coordinates;
    matching one of the plurality of objects in the second image with the key object in the first image;
    receiving a plurality of 3D models from a database, the plurality of 3D models corresponding to at least some of the plurality of objects in the second image; and
    generating an augmented image by inserting the plurality of 3D models into the first image using the first 3D coordinate space and the object coordinate of the key object to duplicate the identified relationships between the at least some of the plurality of objects in the second image to the one matched object in the second image; and
    rendering the augmented image.

2. The method according to claim 1, wherein inserting the plurality of 3D models further comprises replacing the key object in the first image with the 3D model corresponding to the one matched object in the second image.

3. The method according to claim 1, wherein the step of identifying the key object in the first image comprises identifying a plurality of objects in the first image and selecting one of the plurality of objects as the key object according to a pre-determined priority.

4. The method according to claim 1, wherein inserting the plurality of 3D models further comprises replacing at least one identified object in the first image with at least a portion of the plurality of 3D models.

5. The method according to claim 1, wherein the step of matching comprises performing object recognition of the key object in the first image and matching the recognized object with metadata of the 3D models corresponding to the identified plurality of objects.

6. The method according to claim 1, wherein the step of identifying a plurality of objects in the second image comprises using a computer vision algorithm to segment the second image into different parts and identifying said plurality of objects and empty space in the depicted second scene.

7. The method according to claim 1, wherein the relationships between the identified plurality of objects in the second image comprises at least one of: an object is supported by another object; an object is near another object; and an object is to the side of or in front of another object.

8. The method according to claim 1, wherein the relationships between the identified plurality of objects in the second image comprises directional information such that an object is to a specific side of another object, and/or relative rotation, and inserting the plurality of 3D models further comprises adjusting the directional information to fit the plurality of 3D models into the first image.

9. The method according to claim 1, wherein the relationships between the identified plurality of objects in the second image comprise relative and absolute distances to a wall, floor or ceiling of the second scene, and/or comprise relative and absolute distances between the objects in the second 3D coordinate space; and inserting the plurality of 3D models into the first image further comprises prioritizing either the relative or absolute distances according to metadata corresponding to a class of the 3D models when duplicating said relationships to the key object in the first image using the first 3D coordinate space.

10. The method according to claim 8, wherein inserting the plurality of 3D models into the first image further comprises prioritizing either the directional information or the distances according to metadata corresponding to a class of the 3D models when duplicating said relationships to the key object in the first image using the first 3D coordinate space.

11. The method according to claim 9, wherein the prioritization of the different relationship data types according to metadata comprises user preference and/or machine learning methods to decide which of the relationship data types to prioritize when converting between the first and second 3D coordinate space based on the class of the 3D models.

12. The method according to claim 1, wherein the step of identifying relationships between the identified plurality of objects in the second image comprises using machine learning to identify interior design rules and incorporating them to the relationships.

13. The method according to claim 1, wherein the step of capturing the first image depicting the first scene using the image capturing device comprises using a mixed reality device as an image capturing device and wherein the method further comprises displaying the augmented image using the mixed reality device and updating the augmented image in real time as the field of view of the mixed reality device changes.

14. A computer program product comprising a non-transitory computer-readable storage medium with instructions that, when executed by a device having processing capabilities, cause the device to:

capture a first image depicting a first scene using an image capturing device;
identify a key object in the first image;
receive a second image depicting a second scene;
identify a plurality of objects in the second image;
determine a first 3D coordinate space of the first image;
determine a second 3D coordinate space of the second image;
determine an object coordinate for the key object in the first image using the first 3D coordinate space;
determine object coordinates for the identified plurality of objects in the second image using the second 3D coordinate space;
identify relationships between the identified plurality of objects in the second image based on the determined object coordinates;
match one of the plurality of objects in the second image with the key object in the first image;
receive a plurality of 3D models from a database, the plurality of 3D models corresponding to at least some of the plurality of objects in the second image; and
generate an augmented image by inserting the plurality of 3D models into the first image using the first 3D coordinate space and the object coordinate of the key object to duplicate the identified relationships between the at least some of the plurality of objects in the second image to the one matched object in the second image; and
render the augmented image.

15. A device for displaying a first image augmented with image data from a second image, the device comprising circuitry being configured to:

capture the first image depicting a first scene using an image capturing device;
identify a key object in the first image;
receive the second image depicting a second scene;
identify a plurality of objects in the second image;
determine a first 3D coordinate space of the first image;
determine a second 3D coordinate space of the second image;
determine an object coordinate for the key object in the first image using the first 3D coordinate space;
determine object coordinates for the identified plurality of objects in the second image using the second 3D coordinate space;
identify relationships between the identified plurality of objects in the second image based on the determined object coordinates;
match one of the plurality of objects in the second image with the key object in the first image;
receive a plurality of 3D model from a database, the 3D model corresponding to at least some of the plurality of objects in the second image;
generate an augmented image by inserting the plurality of 3D models into the first image using the first 3D coordinate space and the object coordinate of the key object to duplicate the identified relationships between the at least some of the plurality of objects in the second image to the one matched object in the second image; and
render and display the augmented image.

* * * * *